No. 793,103. PATENTED JUNE 27, 1905.
J. SCHOLTZ.
HOSE PIPE COUPLING.
APPLICATION FILED JULY 18, 1904.
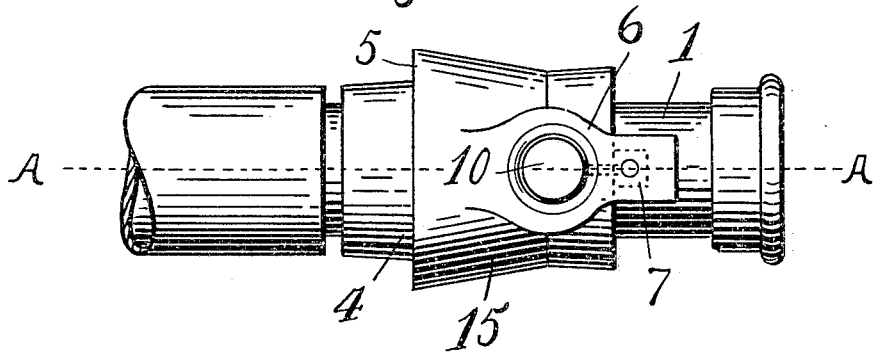
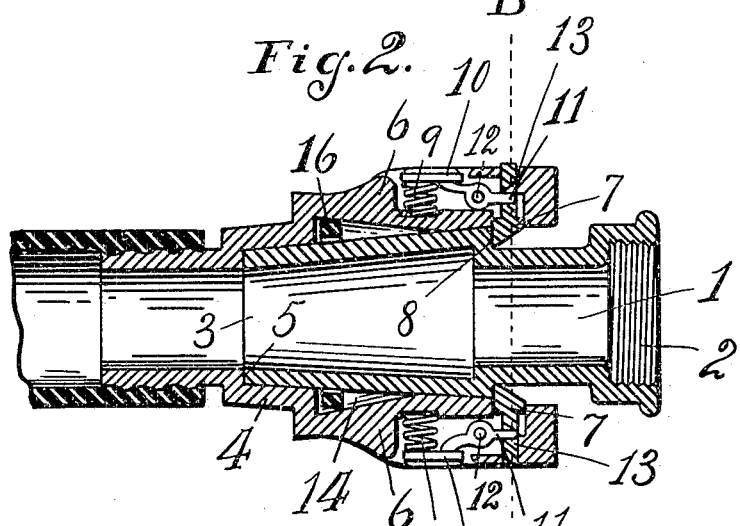
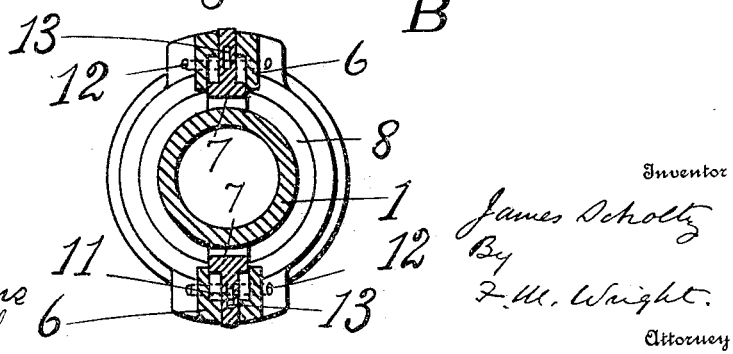

No. 793,103.

Patented June 27, 1905.

UNITED STATES PATENT OFFICE.

JAMES SCHOLTZ, OF SAN FRANCISCO, CALIFORNIA.

HOSE-PIPE COUPLING.

SPECIFICATION forming part of Letters Patent No. 793,103, dated June 27, 1905.

Application filed July 18, 1904. Serial No. 216,951.

*To all whom it may concern:*

Be it known that I, JAMES SCHOLTZ, a citizen of the United States, residing at San Francisco, in the county of San Francisco and State of California, have invented certain new and useful Improvements in Hose-Pipe Couplings, of which the following is a specification.

My invention relates to improvements in pipe-couplings, my improved coupling being especially adapted for connecting parts of a hose-pipe together or for attaching the end of a hose to a faucet.

The object of my invention is to provide an apparatus of this character which shall be cheap and simple, in which the rubber ring or washer will be automatically pressed into place by the pressure of the water to prevent the escape of the water, and in which said washer, while movable to assume such position preventing the escape of water, will remain in place within the union when the nozzle is removed, at the same time being easily removed and replaced by the finger when desired.

My invention therefore resides in the novel construction, combination, and arrangement of parts for the above ends hereinafter fully specified, and particularly pointed out in the claim.

In the accompanying drawings, Figure 1 is a plan view of the coupling. Fig. 2 is a longitudinal section thereof on the line A A of Fig. 1. Fig. 3 is a cross-section on the line B B of Fig. 2.

Referring to the drawings, 1 represents a short pipe or nozzle, which can be attached to a faucet by means of the threaded end 2. The opposite end 3 is conical or tapering, as shown, and enters a union 4, said union being provided with a shoulder 5, against which the end 3 of the nozzle abuts when it is moved into place. The union 4 is also conical or inwardly convergent to receive the conical end of the nozzle. It is provided on diametrically opposite sides with seats 6 for latches 7, which pass behind an annular shoulder 8, formed upon the nozzle, and are held down by means of springs 9, which press outwardly against thumb-pieces 10, attached to levers 11, pivoted in said seats, as shown at 12, their other ends entering slots 13 in the latch-stems. The rear sides of said latches are beveled, so that said nozzle can readily pass between them, forcing them out against said springs, so that when the head of the nozzle has entered the union said latches move behind said shoulder under the action of said springs. To remove the nozzle from the union, all that is necessary is to press with the thumb and finger upon the thumb-pieces 10, withdrawing said latches from said shoulder. Said union also has a wall 15, which meets the larger portion of the tapering nozzle and extends or diverges outwardly therefrom to form an annular recess 14, in which is contained a loose rubber ring or washer 16. When the water is turned on, it passes up between the conical surfaces of the nozzle and the union and enters said recess 14 behind said rubber ring 16, forcing said ring against said oblique wall 15 and wedging it tightly between said oblique wall and the conical wall of the nozzle. The greater is the pressure of the water the more tightly is the ring wedged in between said walls, and thus a perfectly tight union is formed. At the same time the rubber ring is loose within the recess and can easily be withdrawn and replaced. However, being of greater diameter than the mouth of the union through which it would be withdrawn, it is retained in place, unless seized and forcibly withdrawn therefrom.

I claim—

A pipe-coupling comprising a nozzle having an external outwardly-tapering conical wall, a union having an internal conical wall fitting the end of the nozzle, and said union having within or outside the internal wall an oblique internal wall meeting the wider portion of the nozzle and diverging from its union with said wall of the nozzle to form an annular recess with said wall, a rubber ring loose in said recess, said ring being of greater diameter than the mouth of said recess whereby said ring remains in said recess when the nozzle is removed, and means for locking the nozzle and union together, substantially as described.

In witness whereof I have hereunto set my hand in the presence of two subscribing witnesses.

JAMES SCHOLTZ.

Witnesses:
 FRANCIS M. WRIGHT,
 BESSIE GORFINKEL.